Aug. 30, 1966   R. E. BRYANT   3,269,680
ADJUSTABLE CLAMP
Filed May 10, 1965

INVENTOR
Richard E. Bryant
BY
Rennie, Edmonds, Morton,
Taylor & Adams, ATTORNEYS

United States Patent Office 3,269,680
Patented August 30, 1966

3,269,680
ADJUSTABLE CLAMP
Richard E. Bryant, Sepulveda, Calif., assignor to The Hartwell Corporation, Los Angeles, Calif., a corporation of California
Filed May 10, 1965, Ser. No. 454,333
5 Claims. (Cl. 248—73)

This invention relates to a clamp and more particularly to an adjustable clamp having an integral expansion type fastener for detachably securing a cable or the like to a support structure.

It is frequently desirable in many applications to clamp one or more cables, conduits or tubes together and attach the clamped objects to a support structure such as a metal panel. Electronic equipment and aircraft installations are two common examples of such applications. The present invention provides an improved one-piece cable clamp which is adjustable to accommodate a wide range of different cable diameters. The clamp, moreover, has an integral expansion type fastener which simultaneously locks the clamp in a clamped position and attaches the clamp to a support structure. A simple push-pull operation of the fastener serves to fasten or release the clamp quickly and easily.

With the present invention it is possible to detach the clamp from a support structure while at the same time keeping the clamp tightly locked about a cable. It is also possible to adjust the tightness of the clamp about a cable while at the same time the clamp and cable remain fixed in position on a support structure.

A clamp according to this invention has a lock member a strap member and an integral fastener. The lock member and the strap member together serve to provide an adjustable clamp about an object. The integral fastener serves to detachably secure the block member, strap member and any clamped object to a support structure having a clamp receiving aperture therein.

The lock member has both a channel therethrough and an expander aperture therethrough perpendicular to and intersecting with the channel. The strap member, of flexible material, is attached at one end to the lock member. A portion of the strap member at its free end has such cross-sectional dimensions that it is insertable in the channel. This portion of the strap member also has at least one aperture therein of substantially the same dimensions as the expander aperture of the lock member and located transversely of the strap member to be in register with the expander aperture when the strap portion is inserted in the channel.

The integral fastener comprises a plurality of elastic fingers and an expander member. The plurality of elastic fingers are fixed to the lock member about the periphery of the expander aperture and extend away from the lock member, comprising together an expansible portion, the normal external dimensions of which are such that the expansible portion is insertable into a clamp receiving aperture in a support structure. The expander member has an elongated portion, the cross-sectional and longitudinal dimensions of which are such that the elongated portion is insertable through the expander receiving aperture of the lock member to expand the expansable portion formed by the elastic fingers.

Flexible tying means are also provided for attaching the expander member to the remainder of the clamp.

A clamp according to the present invention can be provided in many sizes and materials for many purposes. It may be used in temporary or permanent installations since it is easily installed and detached. Its one-piece construction prevents the loss, dropping or misplacing of essential component parts.

The new clamp is simple to fabricate from inexpensive materials. It has high resistance to vibration and is rattle-free. It operates quietly and requires no lubrication.

These and other features of the invention will be explained in detail in the following description of a preferred embodiment of the invention. In the description reference is made to the accompanying drawing in which.

Figure 1:
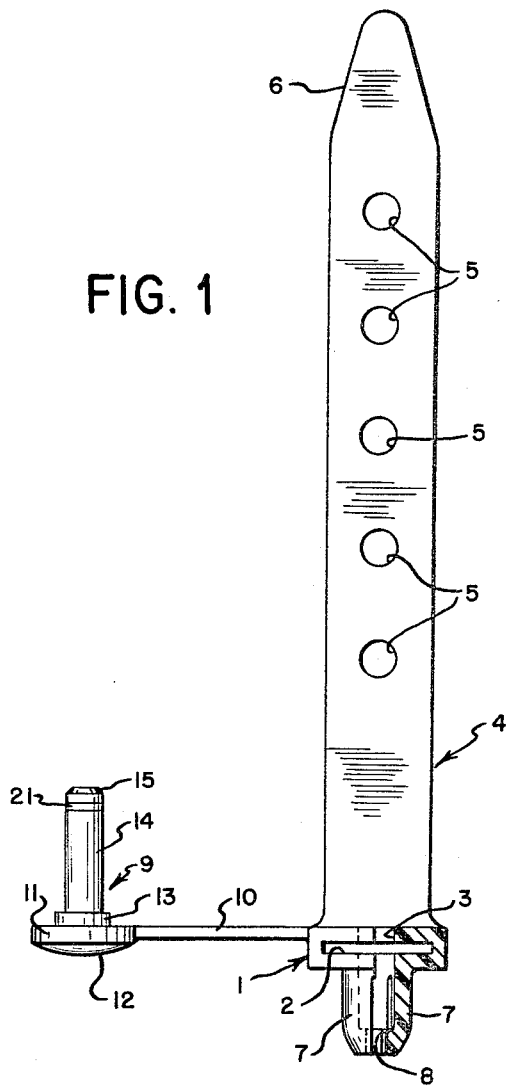
FIG. 1 is a front view, partly in section, of a preferred embodiment of the invention, showing the clamp in a detached and unclamped attitude.
Figure 2:
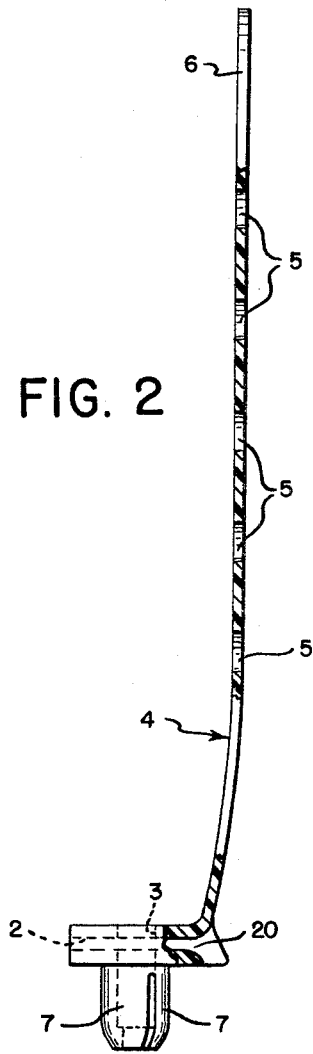
FIG. 2 is a side view, partly cut away, of the clamp shown in FIG. 1.

Referring now to FIGS. 1 and 2, a preferred embodiment of the present invention is shown there in a detached and unclamped attitude. The clamp lock member 1 is of generally rectangular shape with an horizontal rectangular channel 2 passing completely through it. The channel 2 is widened out at one end to form a mouth 20. An expander receiving aperture 3 of circular cross-section passes obliquely through the lock member 1, intersecting with the channel 2, preferably being perpendicular to the channel.

Attached at one end to the lock member 1 is a flexible strap member 4, having a plurality of apertures 5 centrally positioned across its width and evenly spaced along its length. The thickness of the strap member 4 and its width are such that a considerable portion of it extending from its free end 6 and containing the holes 5 is freely insertable into the channel 2. The strap is rounded and tapered at the end 6 to make its insertion into the wide channel mouth 20 easier. The end 6 can also be given a roughened surface to better grip the surface of the channel 2 and thus remain in position when inserted in the channel 2; the natural resiliency of the flexible strap 4 might tend to pull the strap back out of the channel 2. The diameter of the circular strap holes 5 is substantially equal to the diameter of the expander receiving aperture 3 so that when the strap member 4 is inserted into channel 2 the apertures 5 may be brought into register with the expander receiving aperture.

Attached to the bottom of the lock member 1 are three flexible fingers 7 positioned about the periphery of the expander receiving aperture 3 in an evenly-spaced fashion. At their distal ends the fingers 7 have inwardly extending portions or protrusions, one of which is indicated at 8. These portions or protrusions 8 serve to narrow or constrict what may be considered the extension of expander receiving aperture 3. The outer edges of the fingers at their distal ends are bevelled.

An expander member 9 is permanently attached to the lock member 1 by means of flexible strip of material 10. Although, shown tied to the lock member 1, the expander 9 may with equal effect be tied to the strap member 4. The tying means 10 need only be of sufficient length and flexibility to permit the movement of the expander member 9 to be described below. Expander member 9 has a head portion 11 of circular cross-section, rounded on its outer surface 12, a shoulder portion 13 and an elongated portion 14 of circular cross-section. The diameter of portion 14 is slightly less than that of the expander receiving aperture 3 so that portion 14 may be freely inserted into that aperture. The free-end of elongated portion 14 is bevelled or rounded off, as shown at 15, to facilitate such insertion. The tip of portion 14 can be provided with shallow ridges or serrations 21 to assist the fastening action of the clamp in a manner to be described.

Figure 3:
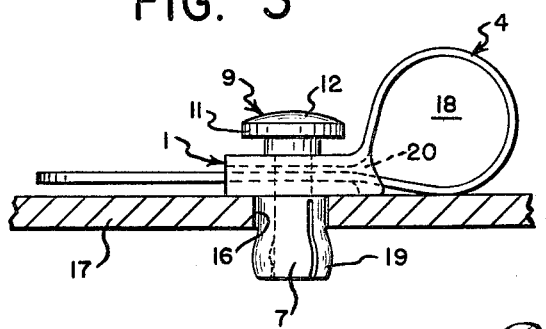
FIG. 3 is a further side view of the clamp showing it installed in a panel and positioned to clamp an object.

The clamping and fastening operation of the clamp may be seen by referring to FIG. 3. There the fingers 7 have been inserted into a clamp receiving aperture 16 in a support structure panel 17. The dimensions of aperture 16 are such that the fingers 7 in their normal unexpanded configuration as shown in FIGS. 1 and 2 are freely insertable into the aperture 16. The strap member is then passed around a cable or other object to be clamped and its free-end 6 is inserted into the widened mouth 20 of channel 2. Although a clamped object is not shown in FIG. 3 it would be held within the space indicated at 18. The strap 4 is then moved back and forth in channel 2 until the appropriate one of the holes 5 is brought into register with the expander receiving aperture 3. The elongated portion 14 of expander 9 is thereupon inserted into the top of the expander receiving aperture 3, passed through the strap hole 5 in register with the aperture 3, thereby locking the clamp strap 4 about the clamped object. As the expander portion 14 is further inserted into the space enclosed by fingers 7 its end 15 encounters the inwardly extending protrusions 8, causing the flexible fingers 7 to deform or bulge outwardly, as indicated at 19, to secure the clamp within aperture 16 and prevent its withdrawal therefrom. It will be seen that the length of the expander portion 14 must be great enough that when the expander shoulder 10 comes into contact with the lock member 1 to stop further motion of the portion 14 into the aperture 3 the expansion of the fingers 7 has been completed. The serrations or shallow ridges 21 on the elongated portion 14 engage and grip the edges of the protruding portions 8 in this position to hold the expander 9 securely despite vibrations or shocks.

In order to detach the clamp from the support structure 17 it is only necessary to grasp the expander head 12 and to pull the expander portion 14 out of the aperture 3. Fingernails or a screw driver may be inserted in the space between the expander head 12 and the lock member 1 to move the expander with a prying motion. When portion 14 has been withdrawn sufficiently to permit the fingers 7 to resume their normal unexpanded shape the clamp and clamped object may be freely detached from the support structure 17. If the expander portion 14 is withdrawn no further, the clamped object remains tightly locked within the space 18. In this manner bundles of otherwise loose wires may be kept clamped continuously while being attached and detached to various support structures.

If, with a clamp attached to a structure as shown in FIG. 3, it is desired to tighten or loosen the strap 4 about a clamped object it is only necessary to completely withdraw the expander portion 14 from the aperture 3, adjust the strap 4 to bring another hole 5 into register with the aperture 3 and then reinsert the expander 9. While this clamp adjustment is taking place the clamp fingers 7 may remain in the clamp receiving aperture 3; there is no necessity to remove the clamp from or reposition it relative to the support structure to which it is attached.

The clamp of the present invention may be fabricated in a variety of ways using a number of suitable materials. The preferred embodiment shown, however, is made of nylon by an injection molding process.

Moreover, although five holes 5 were shown in the clamp strap 4, it should be obvious that any number of holes 5 in a strap of suitable length may be provided to give a wide range of clamp adjustability for objects of different diameters.

It will be understood that various changes in the details, materials, steps and arrangement of parts which have been herein described and illustrated in order to explain the nature of the invention may be made by those skilled in the art within the principle and scope of the invention as expressed in the appended claims.

What is claimed is:

1. A clamp for detachably securing a cable to a structure having a clamp receiving aperture therein, the clamp comprising:
   (a) a lock member having a channel therethrough and an expander aperture therethrough perpendicular to and intersecting with said channel;
   (b) a strap member attached at one end to said lock member, an intermediate portion of said strap member having such cross-sectional dimensions that said portion is insertable in said channel said portion having at least one aperture therein of substantially the same dimensions as said expander aperture and located transversely of said strap member to be in register with said expander aperture when said portion is inserted in said channel;
   (c) a plurality of fingers fixed to said lock member about the periphery of the expander aperture and extending away from the lock member, the normal external dimensions of said fingers being such that said fingers are freely insertable into a clamp receiving aperture; and
   (d) an expander member having an elongated portion, the cross-sectional and longitudinal dimensions of said portion being such that said portion is insertable through said expander aperture to expand said fingers.

2. A clamp according to claim 1 having flexible connecting means for attaching the expander member to the lock member.

3. A clamp according to claim 1 having flexible connecting means for attaching the expander member to the strap member.

4. A clamp for detachably securing a cable to a structure having a clamp receiving aperture therein, the clamp comprising:
   (a) a lock member having a channel therethrough and an expander aperture therethrough perpendicular to and intersecting with said channel;
   (b) a strap member attached at one end to said lock member, an intermediate portion of said strap member having such cross-sectional dimensions that said portion is insertable in said channel said portion having at least one aperture therein of substantially the same dimensions as said expander aperture and located transversely of said strap member to be in register with said expander aperture when said portion is inserted in said channel;
   (c) a plurality of elastic fingers fixed to said lock member about the periphery of the expander aperture and extending away from the lock member, said fingers comprising together an expansable portion, the normal external dimensions of which are such that said expansable portion is freely insertable into a clamp receiving aperture, and the distal ends of said fingers having inwardly extending portions thereon;
   (d) an expander member having an elongated portion with cross-sectional dimensions substantially equal to the dimensions of said expander aperture and a longitudinal dimension at least as great as the length of said fingers; and
   (e) flexible connecting means for permanently attaching the expander member to the lock member.

5. A clamp for detachably securing a cable to a structure having a clamp receiving aperture therein, the clamp comprising:
   (a) a lock member having a channel therethrough and an expander aperture therethrough perpendicular to and intersecting with said channel;
   (b) a strap member attached at one end to said lock member, an intermediate portion of said strap member having such cross-sectional dimensions that said portion is insertable in said channel said portion having at least one aperture therein of substantially the same dimensions as said expander aperture and located transversely of said strap member to be in register with said expander aperture when said portion is inserted in said channel;

(c) a plurality of elastic fingers fixed to said lock member about the periphery of the expander aperture and extending away from the lock member, said fingers comprising together an expansable portion the normal external dimensions of which are such that said expansable portion is insertable into a clamp receiving aperture;

(d) an expander member having an elongated portion, the cross-sectional and longitudinal dimensions of said portion being such that said portion is insertable through said expander aperture to expand said expandable portion; and (e) flexible connecting means for permanently attaching the expander member to the lock member.

References Cited by the Examiner

UNITED STATES PATENTS

| | | | |
|---|---|---|---|
| 2,937,834 | 5/1960 | Orenick et al. | 248—71 |
| 2,995,328 | 8/1961 | Whitted | 248—71 |
| 3,049,771 | 8/1962 | Litwin et al. | 248—71 |
| 3,149,808 | 9/1964 | Weckesser | 248—74 |

CLAUDE A. LE ROY, *Primary Examiner.*